US006880789B2

(12) United States Patent
Benoit et al.

(10) Patent No.: US 6,880,789 B2
(45) Date of Patent: Apr. 19, 2005

(54) CLIP DEVICE

(75) Inventors: Thomas A. Benoit, Boubannais, IL (US); Mark J. Kwilosz, Chicago, IL (US); Gene R. Harris, Lake Orion, MI (US); Brian R. Peek, Mokena, IL (US)

(73) Assignee: Illinois Tool Works Inc., Glenview, IL (US)

( * ) Notice: Subject to any disclaimer, the term of this patent is extended or adjusted under 35 U.S.C. 154(b) by 47 days.

(21) Appl. No.: 10/655,987

(22) Filed: Sep. 4, 2003

(65) Prior Publication Data

US 2005/0051675 A1 Mar. 10, 2005

(51) Int. Cl.[7] ................................................. F16L 3/08
(52) U.S. Cl. ................................................. 248/74.2
(58) Field of Search ........................... 248/74.2, 74.1, 248/74.3, 73, 65

(56) References Cited

U.S. PATENT DOCUMENTS

| 2,415,517 | A | * | 2/1947 | Morehouse | ............... 248/74.3 |
| 4,447,934 | A | * | 5/1984 | Anscher | ............... 24/16 PB |
| 4,802,646 | A | * | 2/1989 | Cattani | ............... 248/316.5 |
| 6,126,119 | A | * | 10/2000 | Giangrasso | ............... 248/58 |
| 6,631,876 | B1 | * | 10/2003 | Phillips | ............... 248/74.2 |
| 6,655,644 | B1 | * | 12/2003 | Gretz | ............... 248/74.1 |

FOREIGN PATENT DOCUMENTS

DE 3708065 A1 * 9/1988

* cited by examiner

Primary Examiner—Ramon O Ramirez
(74) Attorney, Agent, or Firm—Mark W. Croll; Paul F. Donovan

(57) ABSTRACT

A clip device is disclosed for removably securing a tube, such as an air conditioning condenser tube, to a bracket, such as a radiator bracket, which includes a slot. The clip includes an annular body having a first and a second edge, the body defining an opening for the removable reception therein of the condenser tube. The body includes a flexible arm having a proximal end and a distal end. The distal end of the arm defines a tooth which lockingly cooperates with the slot. The arrangement is such that the condenser tube passes through the opening of the body and then the body is further moved axially along the condenser tube so that the bracket extends through the opening and next, the body is rotated about the condenser tube such that the tooth engages the slot for removably securing the condenser tube to the bracket.

20 Claims, 7 Drawing Sheets

CLIP DEVICE

FIELD OF THE INVENTION

The present invention relates to a clip device, and more particularly, to a clip device for removably securing a tube. More specifically, the present invention relates to a clip device for removably securing an air conditioning condenser tube to a radiator bracket which includes a mating slot.

BACKGROUND OF THE INVENTION

The present invention relates generally to a clip device for facilitating the fastening of an air conditioning condenser or collector tube to a bracket extending from an air conditioning radiator.

The invention concerns a clip that is particularly suited for a collector tube or condenser of an automobile radiator. In sum, the invention is a cylindrical or oval shaped bushing or clip with a flexible locking arm that is adapted to be pushed onto a radiator condenser to removably secure the condenser to a radiator bracket.

In the prior art, it is known to use a steel band or clamp to secure the condenser tube to the radiator. This prior known clamp is wrapped around the condenser tube and a bracket or flange extending from the radiator, and a screw associated with the clamp is turned to tighten the clamp around the tube and flange. Problems with this design include the costs associated with the materials and the assembly needed to screw the clamp down. Also, there is a tendency for the clamp to corrode thereby causing the tube to undesirably detach itself from the radiator.

The present invention addresses the aforementioned problems by providing a one-piece plastic clip. A slot is provided in the bracket or flange on the radiator. A locking tooth on the flexible arm of the clip mates with the slot of the bracket to secure the condenser tube to the radiator. To assemble the device, the clip is pushed onto the tube and around the bracket or flange. A relief portion is provided on the inside surface of the clip to receive the bracket or flange. Once pushed on, the clip is rotated a quarter-turn or so and the locking tooth moves into the slot in the mounting flange or bracket. The underside of the relief portion is provided with a camming surface to further tighten the tube to the bracket after the clip is turned onto the mating bracket.

A second embodiment of the present invention concerns an ovalized version of the clip. In essence, the ovalized version is adapted to accommodate tubes having varying diameters or tolerances. The second version of the clip allows the clip to expand to receive a wider tube.

As previously indicated, the clip is preferably a removal, reusable clip. To remove the clip, a tool, such as a screwdriver, can be used to gently pry on the flexible arm and thereafter allow the clip to be rotated so that the tooth is moved out of the mating slot. The clip can then simply be slid off of the tube.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiment described herein explains the best mode known for practicing the invention and will enable others skilled in the art to utilize the invention.

Therefore, a feature of the present invention to provide a clip device that overcomes the problems associated with the prior art arrangements.

Another feature of the present invention is the provision of a clip device that is reliable in use and that is relatively low in cost.

Yet another feature of the present invention is the provision a clip device that is stronger and more capable of withstanding undesirable detachment of the condenser from the radiator, as compared to prior known devices.

Other features and advantages of the present invention will be readily apparent to those skilled in the art by a consideration of the detailed description of a preferred embodiment of the present invention contained herein.

SUMMARY OF THE INVENTION

As noted, the present invention relates to a clip device for removably securing a tube, such as an air conditioning condenser tube, to another member, such as a radiator bracket, which includes a mating slot. The clip includes an annular body having a first and a second edge, the body defining an opening for the removable reception therein of the condenser tube. The body includes a flexible arm having a proximal and a distal end. The distal end of the arm defines a tooth which lockingly cooperates with the mating slot in the tube. The arrangement is such that the tube or condenser receives the body of the clip and the body is then further moved axially along the condenser tube so that the bracket extends through the opening. Next, the body is rotated about the condenser such that the tooth engages the slot for removably securing the condenser to the bracket.

In a more specific embodiment of the present invention, the body is fabricated from plastic material.

Also, the body has an external surface which defines a plurality of axially extending ribs for assisting rotation of the body relative to the condenser.

Furthermore, the opening of the body has a diameter which is slightly greater than a diameter of the condenser so that the passing of the condenser through the opening is permitted.

Moreover, the opening of the body includes an internal surface which extends around a first portion of a periphery of the opening. Also, a relief has a first and a second end, the relief extending around a second portion of the periphery of the opening. The relief includes a cam surface having a first and a second extremity, the cam surface extending from the first end of the relief towards the tooth. A further surface extends from the cam surface to the second end of the relief. Additionally, the proximal end of the arm extends from the first end of the relief and the tooth is disposed in a vicinity of the second extremity of the cam surface. More specifically, the tooth extends inwardly from the distal end of the arm towards the slot for removable engagement thereof with the slot when the body is rotated relative to the condenser. The arm is disposed between the first and second edge of the body.

In an alternative embodiment of the present invention, the opening of the body is of an oval shaped configuration for accommodating condensers having various outside diameters.

Figure 1:
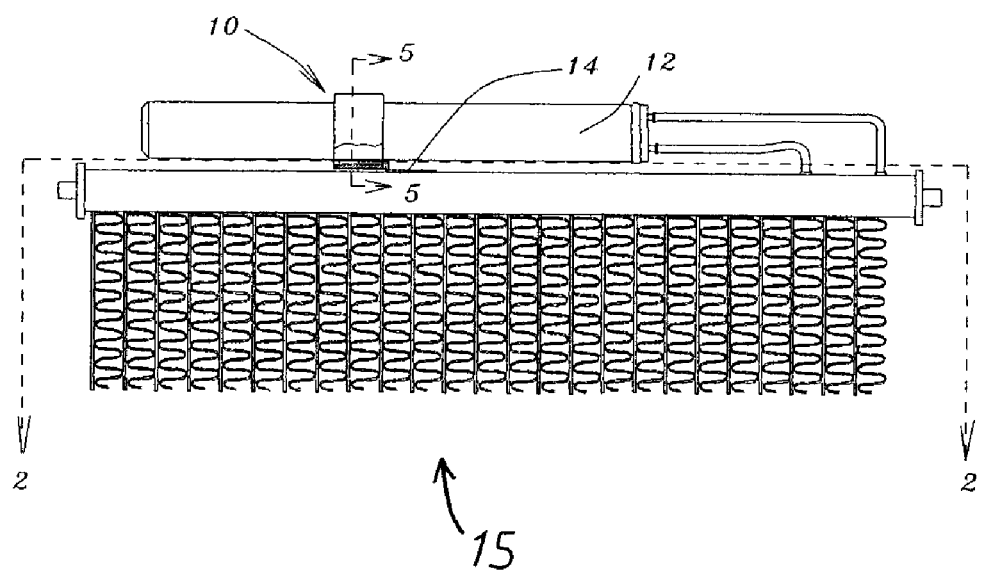
FIG. 1 is a side elevational view of a clip device according to the present invention.

Before the embodiments of the invention are explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF THE PREFERRED EMBODIMENTS

FIG. 1 is a side elevational view of a clip device generally designated 10 according to the present invention. As shown in FIG. 1, the clip device 10 removably secures a tube 12, such as an air conditioning condenser tube, to a bracket 14, such as a radiator bracket.

Figure 2:
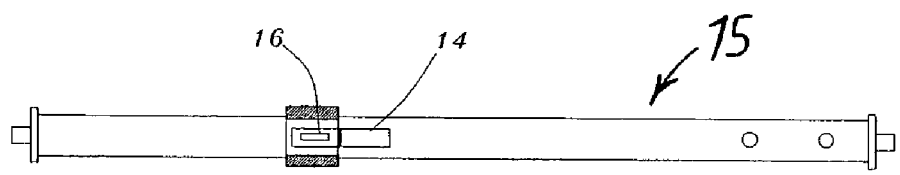
FIG. 2 is a view taken along the line 2—2 of FIG. 1.

FIG. 2 is a view taken on the line 2—2 of FIG. 1. As shown in FIG. 2, the bracket 14 includes a slot 16. The bracket or flange 14 is provided to enable the tube 12 to be connected to the associated member, such as a radiator 15, by virtue of the clip 10.

Figure 3:
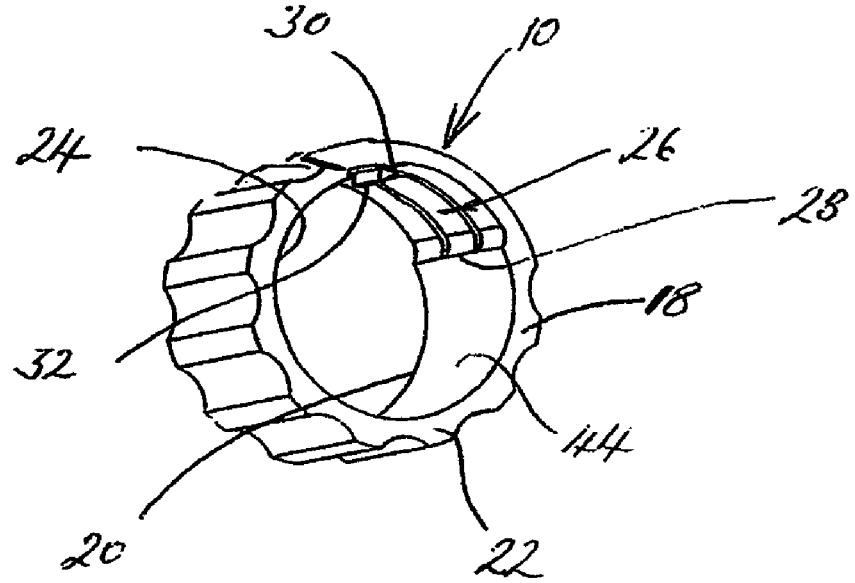
FIG. 3 is an enlarged perspective view of the clip device shown in FIGS. 1 and 2.

FIG. 3 is an enlarged perspective view of the clip device 10 shown in FIGS. 1 and 2. As shown in FIG. 3, the clip includes an annular body 18 having a first and a second edge 20 and 22 respectively. The body 18 defines an opening 24 for the removable reception therein of the tube shown in FIG. 1. The body 18 includes a flexible arm generally designated 26 having a proximal and a distal end 28 and 30 respectively. The distal end 30 of the arm 26 defines a tooth 32 which lockingly cooperates with the slot 16 shown in FIG. 2.

Figure 4:
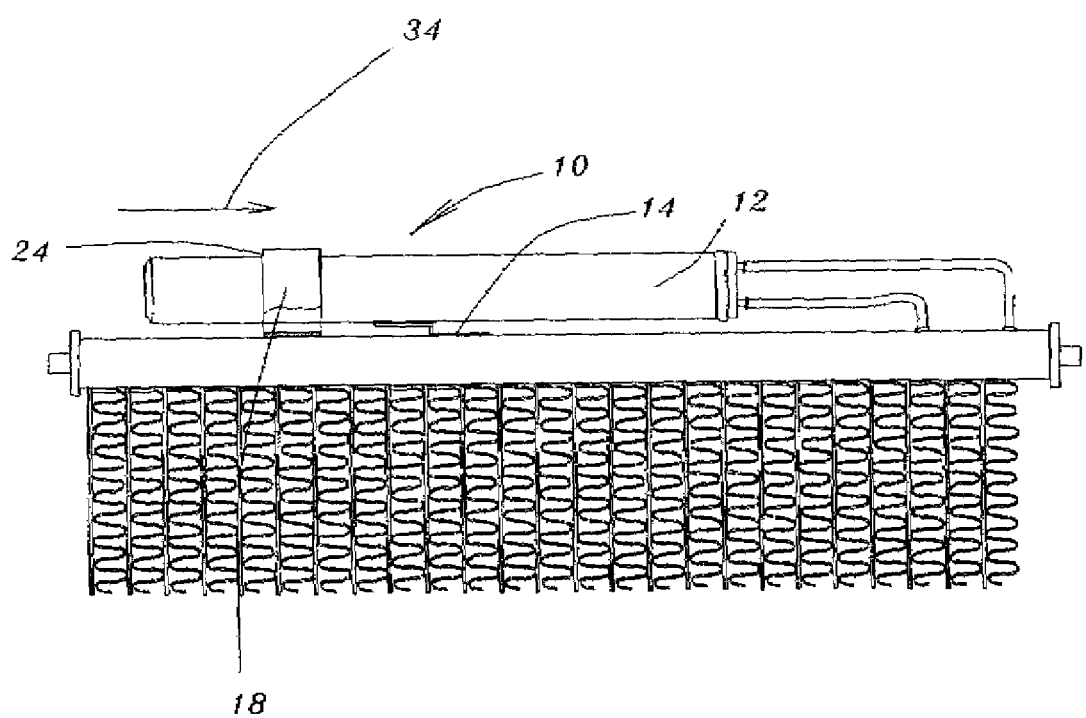
FIG. 4 is a similar view to that shown in FIG. 1 illustrating the fastening of the clip device.

FIG. 4 is a similar view to that shown in FIG. 1. As shown in FIG. 4, the arrangement is such that, the clip device 10 is moved axially relative to the tube 12. The tube 12 passes through the opening 24 of the body 18 as indicated by the arrow 34. The body 18 is moved axially along the tube 12 so that the bracket 14 extends into the opening 24 as can be observed with reference to FIG. 1.

Figure 5:
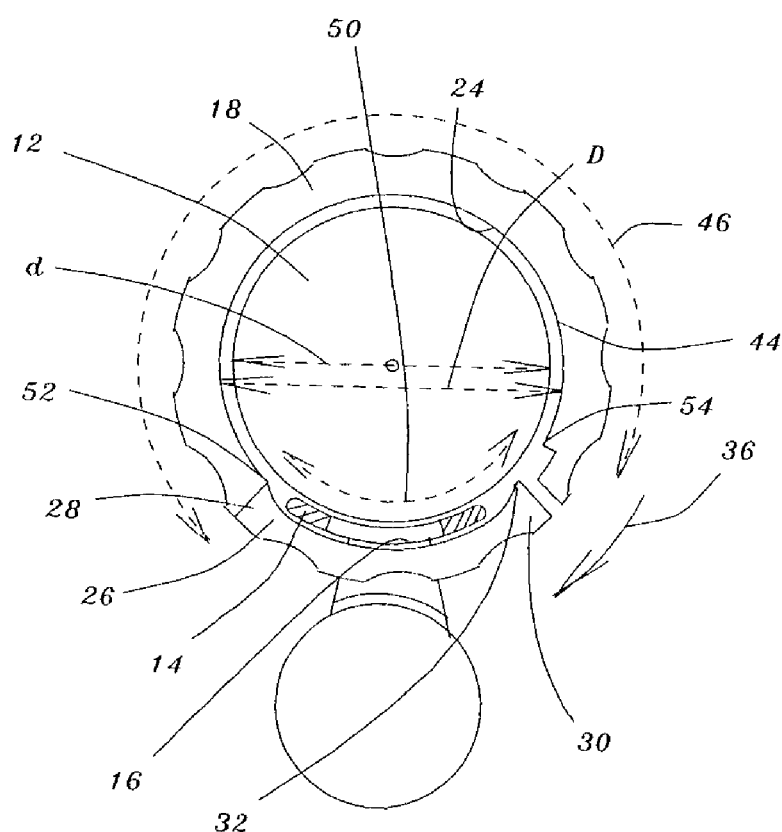
FIG. 5 is an enlarged view taken along the line 5—5 of FIG. 1.

FIG. 5 is an enlarged view taken along the line 5—5 of FIG. 1. As shown in FIG. 5, the body 18 is rotatable about the tube 12 as indicated by the arrow 36. Rotation of the clip 10 causes the tooth 32 of the flexible arm 26 to move into the slot 16, thereby securing the tube 12 to the bracket 14.

Figure 6:
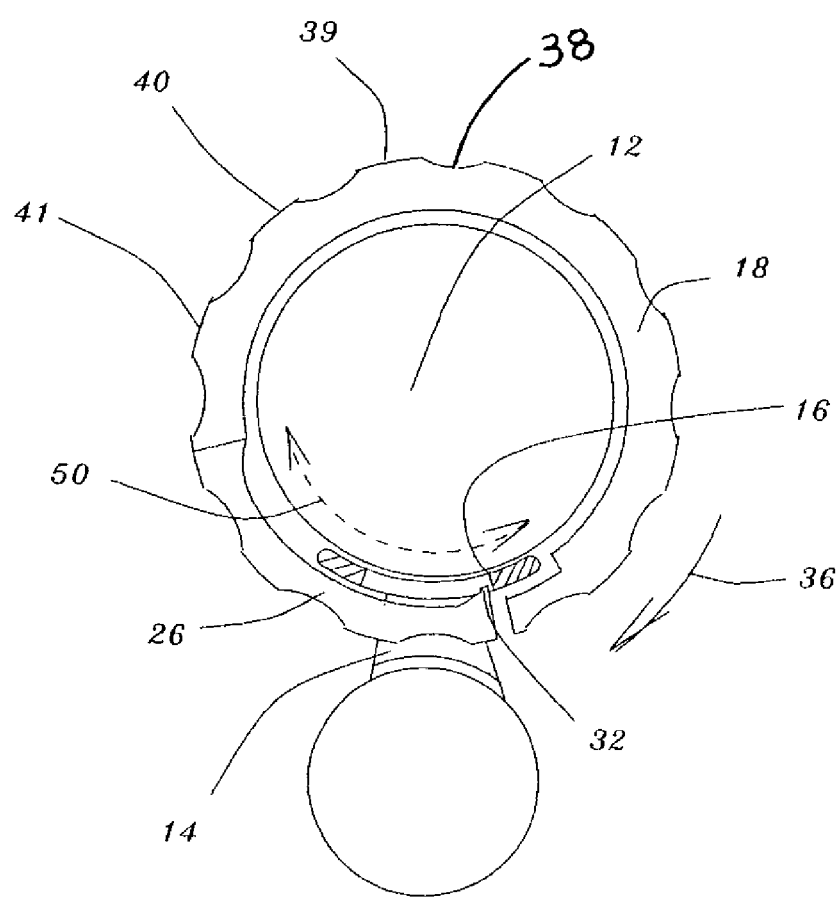
FIG. 6 is a view similar to that shown in FIG. 5 illustrating the clip device having been

FIG. 6 is a similar view to that shown in FIG. 5 but shows the body 18 after having been rotated as indicated by the arrow 36 so that the tooth 32 engages the slot 16 for removably securing the tube 12 to the bracket 14.

In a more specific embodiment of the present invention, the body 18 is fabricated from plastic material. Also, the body 18 has an external surface 38 which defines a plurality of axially extending ribs 39, 40 and 41 as shown in FIG. 6 for assisting rotation of the body 18 relative to the tube 12 as indicated by the arrow 36.

With reference to FIG. 5, the opening 24 of the body 18 has a diameter D which is slightly greater than a diameter d of the condenser 12 so that axial movement of the clip 10 over the tube 12 is permitted as indicated by the arrow 34 in FIG. 4.

Figure 7:
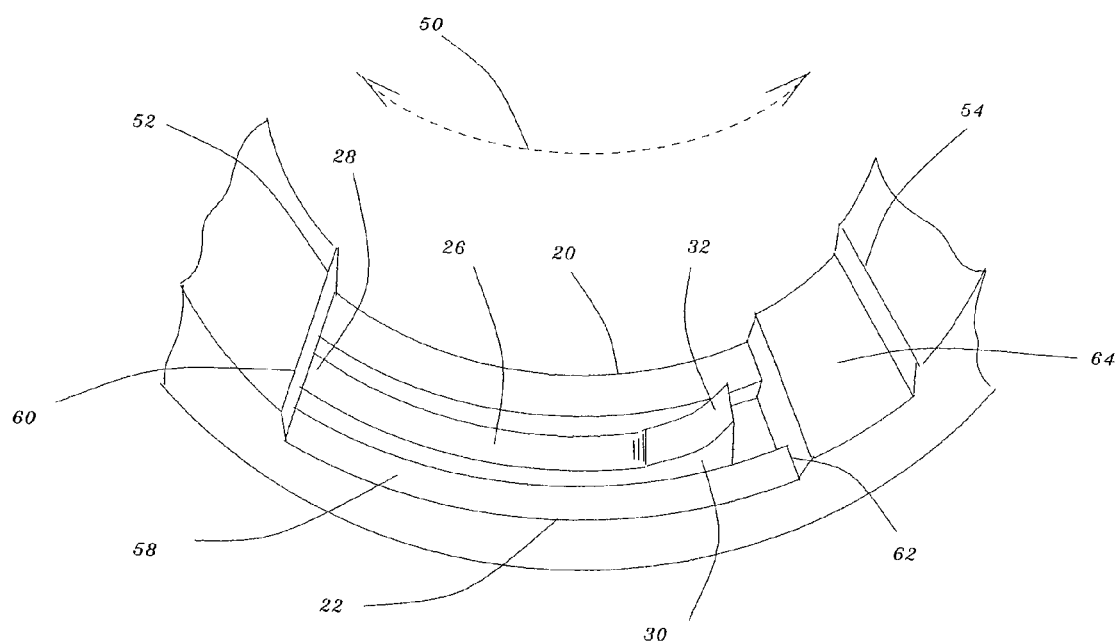
FIG. 7 is an enlarged perspective view of the relief shown in FIG. 5.

As shown in FIG. 3, the opening 24 of the body 18 includes an internal surface 44. As shown in FIG. 5, the internal surface 44 extends around a first portion, as indicated by dashed line 46, of a periphery of the opening 24. A relief 50 having a first and a second end 52 and 54 respectively, extends around a remaining second portion of the periphery of the opening 24. FIG. 7 is an enlarged perspective view of the relief 50 shown in FIG. 5. As shown in FIG. 7, the relief 50 includes a surface 58 having a first and a second extremity 60 and 62 respectively. The surface 58 extends from the first end 52 of the relief 50 towards the tooth 32. A further cam surface 64 extends from the surface 58 to the second end 54 of the relief 50. Additionally, the proximal end 28 of the arm 26 extends from the first end 52 of the relief 50 and the tooth 32 is disposed in a vicinity of the second extremity 62 of the surface 58. As shown in FIG. 7, the arm 26 is disposed between the first and second edges 20 and 22 respectively of the body 18. The tooth 32 extends inwardly from the distal end 30 of the arm 26 towards the slot 16 for removable engagement thereof with the slot 16 as shown in FIG. 6, when the body 18 is rotated relative to the tube 12 as indicated by the arrow 36.

Figure 8:
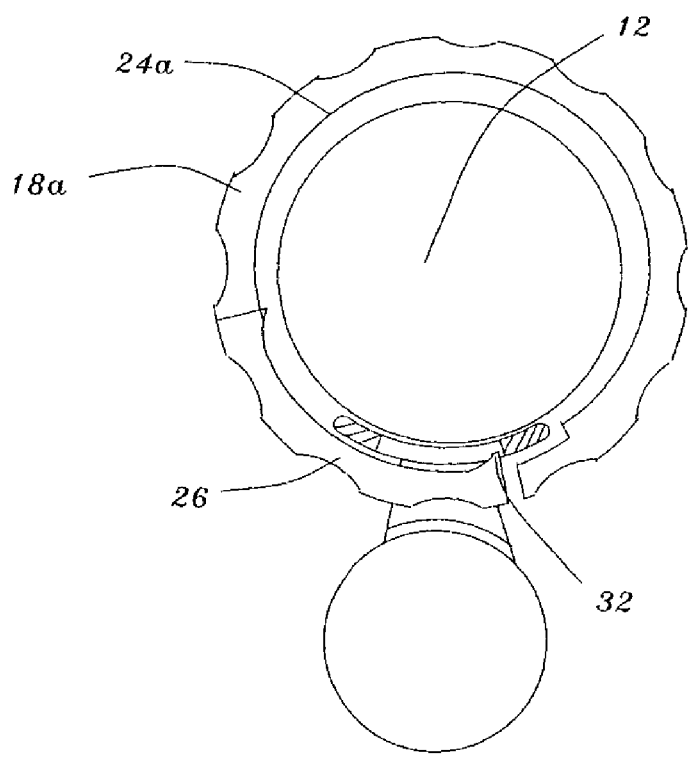
FIG. 8 is a similar view to that shown in FIG. 6 illustrating an alternative embodiment of sent invention.

FIG. 8 is a similar view to that shown in FIG. 6 but shows an alternative embodiment of the present invention. An opening 24a of the body 18a is of an oval shaped configuration for accommodating condensers having various outside diameters.

In operation of the clip device 10, the clip device 10 is moved axially along the condenser tube 12 with the condenser tube 12 extending through the opening 24. When the radiator bracket 14 is sufficiently received within the opening 24, the clip 10 is rotated as shown, for example, by the arrow 36 until the bracket 14 is received by the relief 50. Thereafter, further rotation of the clip 10 causes the bracket 14 to engage surface 62. The surface 62 is adapted and configured in such a manner to assist moving the clip 10 over the edge of the bracket 14 so that the bracket 14 slides over the surface 64. The camming surface 64 is configured and arranged in such a manner to tighten the clip 10 to the bracket 14. The flexible nature of the arm 26 enables the tooth 32 to pass over a portion of the bracket 14 as the clip is so rotated. The clip 10 is rotated until such time as the tooth 32 snaps into the slot 16 of the bracket 14. In this manner, the tube 12 is secured to the bracket 14 and, therefore, the member or radiator 15. Although the tooth 32 fits into the slot 16, alternative constructions, such as a hole or detent, can be utilized in accordance with the principles of the present invention. It is also noted that the tooth 32 or equivalent structure can be found on the bracket 14 and the mating structure, such as a slot 16 or hole or detent can be found on the arm 26 of the clip 10.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art. Various features of the invention are set forth in the following claims.

What is claimed is:

1. A clip device for removably securing a tube to a bracket, said clip comprising:
an annular body having an external surface defining a diameter of a generally constant size, said annual body further having a first edge and a second edge, said body defining an opening extending between said first edge and said second edge for the removable reception therein of the tube, said body including a flexible arm positioned between said first edge and said second edge, said flexible arm having a proximal end and a distal end, one of said distal end of said arm and the bracket defining a tooth and the other of said distal end of said arm and the bracket including a mating structure adapted to lockingly cooperate with said tooth, the arrangement being such that, the tube is passed through said opening of said body and then, said body is further moved axially along the tube so that the bracket extends into said opening and said body is then rotated about the tube until said tooth engages said associated mating structure, thereby removably securing the tube to the bracket.

2. A clip device as set forth in claim 1, wherein said body is fabricated from plastic material.

3. A clip device as set forth in claim 1, wherein said body has an external surface which defines a plurality of axially extending ribs for assisting rotation of said body relative to the tube.

4. A clip device as set forth in claim 1, wherein said opening of said body has a diameter which is slightly greater than a diameter of the tube to enhance the axial movement of the clip over the tube.

5. A clip device as set forth in claim 1, wherein said body further includes an internal surface which extends around a first portion of a periphery of said opening, and a relief area having a first and a second end, said relief area extending around a second portion of said periphery of said opening, said relief area being adapted and configured to receive the bracket.

6. A clip device as set forth in claim 5, wherein said relief area further includes a surface having a first and a second extremity, said surface extending from said first end of said relief area towards said distal end of said arm, and a further camming surface which extends from said second extremity of said surface to said second end of said relief area.

7. A clip device as set forth in claim 6, wherein said proximal end of said arm extends from said first end of said relief area.

8. A clip device as set forth in claim 6, wherein said tooth is disposed on said arm and in a vicinity of said second extremity of said surface.

9. A clip device as set forth in claim 1, wherein said tooth is disposed on said arm and extends inwardly from said distal end of said arm towards the mating structure for removable engagement thereof when said body is rotated relative to the tube.

10. A clip device as set forth in claim 1, wherein said arm is disposed between said first and second edge of said body.

11. A clip device as set forth in claim 1, wherein said opening of said body is of an oval shaped configuration for accommodating tubes having various outside diameters.

12. A clip device for removably securing an air conditioning condenser tube to a radiator bracket of a radiator, said clip comprising:
an annular body having a first edge and a second edge and an opening extending therebetween for the removable reception therein of the condense tube, said body including an internal surface which extends around a first portion of a periphery of said opening and a second portion which defines a first relief area having a first end, a second end and a surface therebetween, said second portion further defining a second relief area having a camming surface which extends between said second end of said surface and an end of the first portion, said body further including a flexible arm having a proximal end connected thereto and a distal end freely spaced therefrom, said arm being located within said second portion of said body such that said proximal end of said arm extends from said first end of said first relief area and said distal end of said arm is located near, but spaced from, said surface of said first relief area, said arm including a tooth extending inwardly from said distal end towards said internal surface, so that to secure the condenser tube to the bracket, said clip is positioned over the condenser tube such that said opening of said clip receives the condenser tube, thereafter, said clip is moved axially along the condenser tube until the bracket slides within said first relief area of said clip, said clip being configured to be rotatable about the tube so as to allow the bracket to slide within said first relief area, once the bracket is received by said first relief area, said clip is caused to rotate so that the bracket engages and passes over said camming surface of said second relief area, as said clip is so rotated, said flexible arm is caused to pass over a portion of the bracket until said tooth snaps into a slot found in the bracket thereby securing the condenser tube to the bracket, once secured at least a portion of the bracket is engages said camming surface of said second relief area of said clip.

13. A clip device as set forth in claim 12, wherein said body is made of a plastic material.

14. A clip device as set forth in claim 12, wherein said body has an external surface which defines a plurality of axially extending ribs for assisting rotation of said body relative to the condenser.

15. A clip device as set forth in claim 12, wherein said opening of said body has a diameter that is slightly greater than a diameter of the condenser tube to enhance the axial movement of the clip over the tube.

16. A clip device as set forth in claim 12, wherein said opening of said body is of an oval shaped configuration for accomodating condenser tubes having varying outside diameters.

17. A clip device as set forth in claim 12, wherein said body includes a portion wherein said flexible arm is located, said portion including a slot on each side of said flexible arm to allow a tool to be inserted therein so as to be able to move or pry said flexible arm away from the bracket to cause said tooth to be disengaged from the slot in the bracket, thereby releasing said clip from the bracket to allow the condenser tube to be disengaged from the bracket.

18. A clip device for removably securing a tube to a bracket, said clip comprising:

an annular body having a first edge and a second edge, said body defining an opening for the removable reception therein of the tube, said body including a flexible arm having a proximal end and a distal end, one of said distal end of said arm and the bracket defining a tooth and the other of said distal end of said arm and the bracket including a mating structure adapted to lockingly cooperate with said tooth, the arrangement being such that, the tube is passed through said opening of said body and then, said body is further moved axially along the tube so that the bracket extends into said opening and said body is then rotated about the tube until said tooth engages said associated mating structure, thereby removably securing the tube to the bracket, wherein said body further includes an internal surface which extends around a first portion of a periphery of said opening, and a relief area having a first and a second end, said relief area extending around a second portion of said periphery of said opening, said relief area being adapted and configured to receive the bracket.

19. A clip device as set forth in claim 18, wherein said relief area further includes a surface having a first and a second extremity, said surface extending from said first end of said relief area towards said distal end of said arm, and a further camming surface which extends from said second extremity of said surface to said second end of said relief area.

20. A clip device as set forth in claim 19, wherein said proximal end of said arm extends from said first end of said relief area, and wherein said tooth is disposed on said arm and in a vicinity of said second extremity of said surface.

* * * * *